United States Patent [19]

Suzuki

[11] Patent Number: 4,589,698
[45] Date of Patent: May 20, 1986

[54] HEAD-REST DEVICE FOR A VEHICLE SEAT

[75] Inventor: Hiroshi Suzuki, Akishima, Japan

[73] Assignee: Tachikawa Spring Co., Ltd., Tokyo, Japan

[21] Appl. No.: 594,529

[22] Filed: Mar. 29, 1984

[51] Int. Cl.⁴ .............................................. A47C 7/38
[52] U.S. Cl. .................... 297/410; 248/414; 403/104
[58] Field of Search ............... 297/410, 391, 396, 216; 248/414, 411, 412, 410; 403/104

[56] References Cited

U.S. PATENT DOCUMENTS

| | | | |
|---|---|---|---|
| 3,230,595 | 1/1966 | Kedem | 403/104 |
| 3,480,247 | 11/1969 | Waner | 248/410 |
| 3,517,184 | 6/1970 | Norton et al. | 403/104 |
| 3,603,623 | 9/1971 | Widman | 403/104 |
| 3,856,253 | 12/1974 | Seebinger | 403/104 |
| 4,411,470 | 10/1983 | Nishimura et al. | 297/410 |
| 4,427,233 | 1/1984 | Matumoto | 297/410 |
| 4,489,979 | 12/1984 | Zyngier | 297/410 |

FOREIGN PATENT DOCUMENTS

| | | | |
|---|---|---|---|
| 2408746 | 7/1979 | France | 403/104 |
| 742636 | 6/1980 | U.S.S.R. | 403/104 |

Primary Examiner—Francis K. Zugel
Assistant Examiner—Mark W. Binder
Attorney, Agent, or Firm—Cushman, Darby and Cushman

[57] ABSTRACT

A head-rest device for a vehicle seat is disclosed in which a head-rest stay mounting a head-rest in its upper portion is supported in such a manner that it can be adjusted vertically with respect to a seat back by means of a lock mechanism provided in a head-rest holder. According to the lock mechanism of the invention, a torsion lock spring is fitted into the head-rest holder through which the head-rest stay is inserted and which is fixed to the seat back. The head-rest stay can be locked relative to the head-rest holder by means of the winding force of the torsion lock spring. An operator can be rotated to rewind the torsion lock spring so as to release such locking of the head-rest stay. Thus, it is possible to adjust the vertical position of the head-rest as required.

5 Claims, 4 Drawing Figures

HEAD-REST DEVICE FOR A VEHICLE SEAT

BACKGROUND OF THE INVENTION

1. Field of the Invention

The present invention relates to a head-rest device for a vehicle seat or the like and, more particularly, to an improved head-rest device which can be adjusted vertically relative to a seat back.

2. Description of the Prior Art

A head-rest device of this type must be capable of vertical adjustments of its height so that it can be applied to many occupants of varying sitting heights. Since this vertical height adjustment is to be made manually, it is preferred that such head-rest device can be operated with a light force to adjust its height. With such light-force design, however, when heavy shocks are given, the head-rest device will be unnecessarily lowered in height. For example, when shocks are applied to the head of an occupant in case of a rear-end collision or the like, a force acting in a direction to push down the head-rest device is produced; since this kind of push-down force is usually considerably large, the head-rest device of such light-force design will be forced to go down unnecessarily and sharply, and thus it fails to safely hold the occupant. This means it is difficult to simultaneously satisfy both requirements of easy manual operation and safety holding.

Therefore, in order to satisfy these two conflicting needs at the same time, that is, an easy height adjustment and a positive holding of a predetermined position against shocks applied from above, there have been conventionally proposed and practiced various kinds of head-rest devices which are provided with a lock mechanism between head-rest stays and their associated head-rest holders.

However, these conventional head-rest devices are complicated in structure. Thus, most of them include a stepwise adjustment lock mechanism in which each of the head-rest stays is formed with some cutaway portion in which an engagement member on the side of the associated head-rest holder is pressed against and engaged with the cutaway portion of the head-rest stay so as to hold the head-rest stay vertically. With such stepwise adjustment lock mechanism, a fine positional adjustment of the head-rest stay is impossible and thus it is not possible to set the height of the head-rest to its best position with respect to various occupants. Also, the formation of the cutaway portion in the heat-rest stay presents a problem since it decreases the strength of the head-rest stay and thus that of the entire head-rest device.

SUMMARY OF THE INVENTION

Accordingly, the present invention aims at eliminating the drawbacks seen in the above-mentioned conventional head-rest devices.

Therefore, the principal object of the invention is to provide a head-rest device which includes a simplified lock mechanism provided between head-rest stays and head-rest holders to be mounted to a seat back. In accomplishing this object, according to the invention, there is eliminated the need for any cutting operation to form conventional cutaway portions in the head-rest stay as in the prior art devices. The lock mechanism, according to the invention, thus comprises a cavity, a torsion spring, and a cap as an operator, so that the number of parts of the lock mechanism can be reduced as simplifying well as its assembling process.

Another object of the invention is to provide an improved lock mechanism which is capable of fine adjustment of the height of the head-rest device. In order to attain this object, the torsion spring is pressed against the head-rest stay for locking, while this torsional lock spring can be rewound by rotation of the operator and becomes larger in diameter so that the head-rest stay can be moved vertically. Thus, the vertical position of the head-rest device can be adjusted in a stepless manner. In other words, the head-rest device of the invention can be set to the best position relative to a particular occupant and is also easy to release its setting or locking.

DETAILED DESCRIPTION OF A PREFERRED EMBODIMENT OF THE INVENTION

Figure 1:
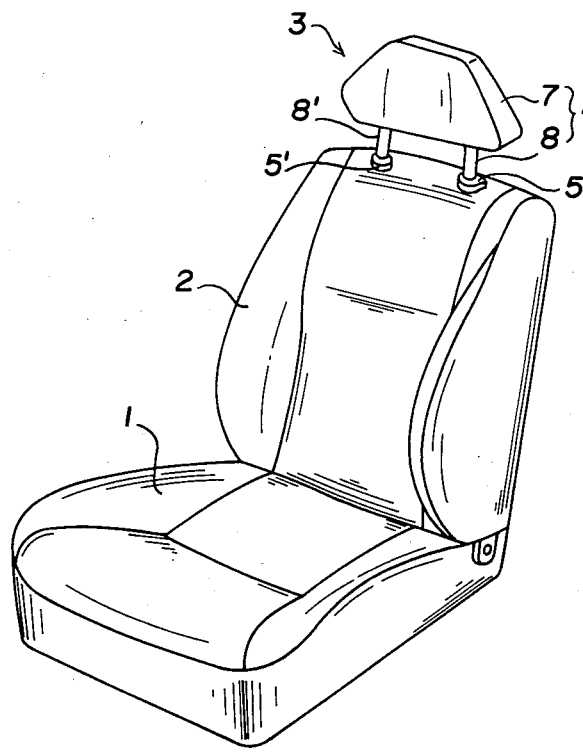
FIG. 1 is a perspective view of a vehicle seat provided with a head-rest device constructed in accordance with the present invention.
Figure 4:
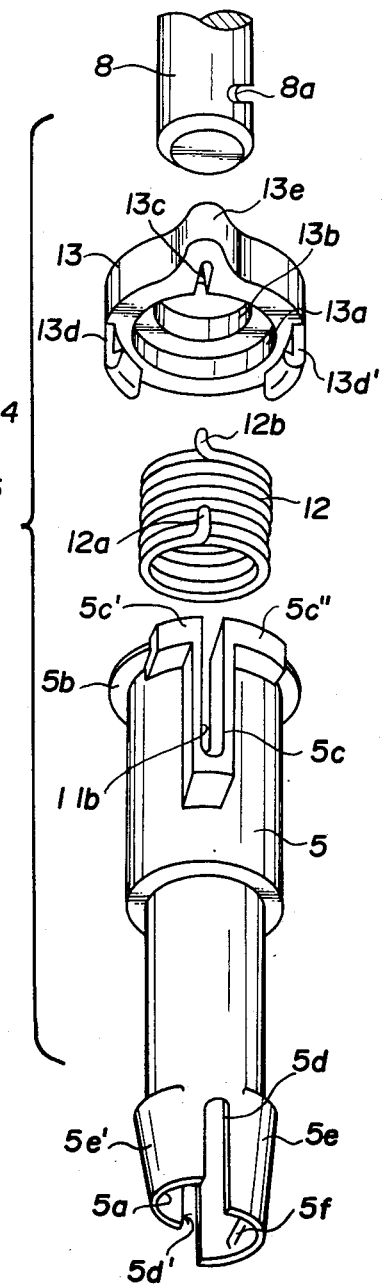
FIG. 4 is an exploded perspective view of the same main portions as in FIG. 3.
Figure 2:
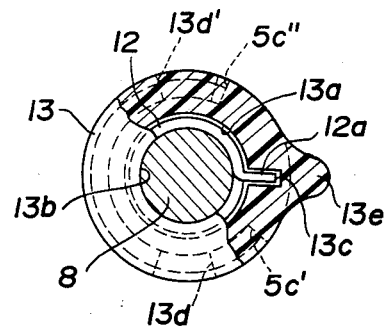
FIG. 2 is a partially sectional plan view of main portions of the head-rest device of the invention.
Figure 3:
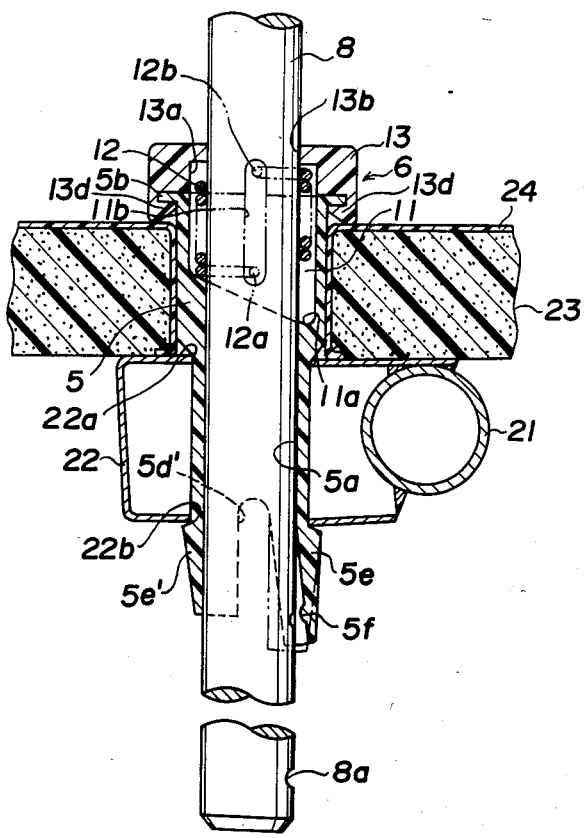
FIG. 3 is a longitudinal sectional side view of main portions of the same.

FIG. 1 illustrates a vehicle seat including a head-rest device constructed in accordance with the invention. In this figure, reference numerals (1), (2) and (3) designate a seat cushion, a seat back and a head-rest device, respectively. This head-rest device (3) is constructed in accordance with the invention and comprises a head-rest body (4), two head-rest holders (5) and (5') to be mounted to the upper portion of the seat back (2), and a lock mechanism (6).

Head-rest body (4) comprises a so-called head-rest (pillow member) (7) and two support members, i.e., two head-rest stays (8) and (8') extended from and mounted to the head-rest (7). One head-rest stay (8) is inserted into its associated head-rest holder (5) which is provided with the lock mechanism (6).

Lock mechanism (6) comprises a cavity (11) formed in the heat-rest holder (5), a torsion lock spring (12), and a cap (13) serving as an operator. Specifically, in the upper portion of a stay insertion through bore (5a) of the head-rest holder (5) there is formed a cavity (11) being larger in diameter than the insertion through bore (5a) and having an inclined surface (11a) as its bottom surface. The side surface of cavity (11) is formed with a slotted groove (11b) extending along the axis of the insert through bore (5a). The head-rest holder (5) is provided in its upper end outer periphery with an integral flange (5b). The head-rest holder (5) also has a thicker portion (5c) extending from the outer edge portion of the slotted groove (11b) to the flange (5b), and thicker portions (5c'), (5c") located on the side of the flange (5b) are formed to extend from the outer ends of the slotted groove in opposing directions for a predetermined length, respectively, so as to provide stoppers with respect to the cap which will be described later.

Torsion lock spring (12) is a coil spring having a winding diameter of which inside diameter is slightly smaller than the outside diameter of the head-rest stay (8). This spring is formed to extend slightly longer than the depth of the cavity (11) and its starting and terminating ends are bent up to form hooks (12a) and (12b) respectively. With one hook (12a) being inserted into the slotted groove (11b), the torsion lock spring (12) is inserted into the cavity (11) of the head-rest holder (5). In this fitted condition, the upper portion of the torsion lock spring (12) is extended out of the upper mouth of the cavity (11).

Cap (13) is formed on its internal surface side with a recess (13a) of a diameter substantially equal to the inside diameter of the cavity (11) of the head-rest holder (5), centrally of which recess (13a) is formed a through bore (13b) of a diameter equal to that of the insertion through bore (5a) of the head-rest holder (5). The recess (13a) is also formed on its inner peripheral surface with a groove (13c) which extends in the axial direction of the recess and corresponds to the slotted groove (11b) of the cavity (11). Also, the cap (13) is provided along the peripheral edges on its internal surface side with a plurality of engagement clicks (13d), (13d') which can be moved and engaged axially with respect to the flange (5b) of the head-rest holder (5). Further, the cap (13) is provided in a portion of its outer peripheral surface, e.g., a portion corresponding to the groove (13c) with a convex portion (13e) which is formed by protrusion.

The cap (13) is positioned to correspond to the upper end side of the head-rest holder (5) such that the upper portion of the torsion lock spring (12) extended from the cavity (11) is fitted into the recess (13a) of the cap (13). The other hook (12b) of the spring is engaged with the groove (13c) of the cap. The engagement clicks (13d), (13d') are then engaged with the flange (5b) over its outer periphery as well as its lower edge to mount the cap (13) to the head-rest holder (5), so that the cap (13) can be rotated with respect to the head-rest holder (5) against the torsional biasing force of the torsion lock spring (12). This rotational movement of the cap (13) rewinds the torsion lock spring (12) to spread the inside diameter of the torsion lock spring (12). This rotation of the cap (13) is restricted within a range in which the engagement clicks (13d), (13d') are stopped by the thicker portions (5c'), (5c'') of the head-rest holder (5) located on the side of the flange (5b).

In addition, the head-rest holder (5) is formed in its lower end portion with split grooves (5d), (5d') which correspondingly extend upwardly from the lower end edge of the holder in the direction of its diameter. The split grooves (5d) and (5d') divide the lower end portion of the head-rest holder (5) into two half sections which are provided on their outer peripheries with return-prevention ridges (5e) and (5e'), respectively. Also, a projection (5f) is projected on and from the inner periphery of the lower end one half section of the insertion through bore (5a).

The head-rest holder (5) provided with the thus arranged lock mechanism is supported by the seat back (2) in such a manner that the lower half section of the head-rest holder (5) is inserted into and engaged with the upper portion of the seat back (2), that is, upper and lower support bores (22a) and (22b) formed in a head-rest bracket (22) which is fixed to the upper edge portion of a back frame (21). On the other hand, the upper half section of the head-rest holder (5) is embedded into a pad member (23) and its upper end portion including the flange (5b) is projected upwardly of the upper surface of a top member (24). In this state, the cap (13) is exposed upwardly of the upper surface of the top member (24) or the upper surface of the seat back (2). The head-rest stay (8) is inserted into the thus fixed head-rest holder (5). During insertion of the head-rest stay (8), the operator of the lock mechanism (6) or the cap (13) is first rotated against the torsional biasing force of the torsion lock spring (12) to rewind the torsional lock spring (12) and thus to widen its inside diameter, and then the head-rest stay (8) is inserted via the through bore (13) of the cap (13) and the widened inside diameter portion of the torsion lock spring (12) into the stay insertion bore (5a) of the head-rest holder (5). The head-rest stay (8) is inserted up to a predetermined position in this manner. Upon release of the cap (13), the torsion lock spring (12) then tends to return to its original position due to its own elasticity or biasing force with its inside diameter being reduced, and as a result of this, it is strongly pressed against the circumferential surface of the head-rest stay (8), that is, spring (12) is now in a position to grasp the head-rest stay (8) tightly. In this position, the head-rest stay (8) is locked vertically with respect to the head-rest holder (5).

In other words, the normal locking of the head-rest device of the invention is achieved in such a manner that the torsion lock spring (12) is held between the bottom of the cavity (11) of the head-rest holder (5) and the internal surface of the recess (13a) of the cap (13) and thus its vertical movement is prevented, whereby the head-rest stay (8) is locked. In the thus achieved normal locking state, when shocks are applied to the head-rest (7) to cause a great downward sliding force to the head-rest stay (8), the torsion lock spring (12) is caused to move down integrally with the head-rest stay (8) so that it is strongly abutted against the bottom of the cavity (11). Since the bottom of the cavity (11) is formed in the form of the inclined surface (11a), the torsion lock spring (12) is deformed along this inclined surface (11a) to more strongly grasp the head-rest stay (8), that is, to lock the head-rest stay (8) more positively, so that the head-rest stay is almost completely prevented from sliding downward any further.

However, even in the illustrated embodiment, the other head-rest holder (5') and the other head-rest stay (8') are so constructed as to be able to slide relative to each other as in the conventional devices.

According to the invention, since the head-rest stay (8) is locked relative to the head-rest holder (5) in the above-mentioned manner, the head-rest (7) can be held at a desired height level.

In order to move the head-rest (7) from its old locked position to a new position which is suitable for the physique of a new occupant, the operator of the lock mechanism (6) or the cap (13) is again rotated to turn the torsion lock spring (12) in its rewinding direction. This widens the inside diameter of the spring and thus release its abutment against the head-rest stay (8), enabling the head-rest stay (8) to slide with respect to the head-rest holder (5). Then, after the head-rest stay (8) has been moved so as to position the head-rest (7) at its desired height, and the cap (13) is released the torsion lock spring (12) is then again pressed against the head-rest stay (8) thanks to its own biasing force so as to again achieve locking of the head-rest stay (8). In this manner, according to the invention, the height of the head-rest (7) can be adjusted optionally in a stepless way.

Further, the head-rest stay (8) is formed in its lower end portion with a notch (8a) adapted to be engaged with the projection (5f) provided in the lower end internal periphery of the stay insertion bore (5a) of the head-rest holder (5). When the head-rest stay (8) is pulled up or slid upwardly with respect to the head-rest holder (5), this notch (8a) is engaged with the projection (5f) to change the pull-up force suddenly and heavily, which can not only serve as an alarm for the upper-most position of the head-rest (7) but also prevent an unnecessary removal of the head-rest stay (8).

Although in the illustrated embodiment of the invention the head-rest (7) is supported by the two head-rest stays (8), (8') which are in turn held by the two head-rest holders (5), (5') respectively, the head-rest may be supported by a single head-rest stay and at the same time may be provided with the same lock mechanism (6) as mentioned above.

As described before, according to the invention, the head-rest is structured such that the head-rest stay can be locked relative to the head-rest holder to be fixed to the seat back by means of the forced abutment of the torsional lock spring against the head-rest holder. Therefore, the vertical position of the head-rest can be adjusted in a stepless way and thus the head-rest can be set to any height that suits best a particular occupant.

Also, according to the invention, there is eliminated the need to cut into the head-rest stay to form cutaway portions or the like therein. As a result of this, the head-rest device of the invention is greatly improved in strength, very simple in structure, smaller in number of its components, and simplified in assembling thereof, resulting in the reduction of its cost.

What is claimed is:

1. A head rest device for a vehicle seat comprising:
    a head rest stay supported so as to be adjustable vertically:
    a heat rest holder mounted to a seat back of said vehicle seat, said head rest holder having a through bore formed therein for receipt of said head rest stay therethrough; and
    a lock mechanism provided in said seat rest holder, said lock mechanism including a cavity formed in an upper portion of said through bore of said holder, a cap rotatably provided on an upper mouth portion of said head rest holder, and torsion lock spring means disposed in said cavity such that one end of said spring means is secured to said head rest holder and the other end thereof is secured to said cap; wherein
    said cavity is larger in diameter than said through bore of said head rest holder and has a bottom defining an inclined surface, said torsion lock spring means being disposed such that one side thereof is abutted at its lower end against an upper-most portion of said inclined surface of said cavity while the other side thereof at said lower end is separated from a lowermost portion of said inclined surface,
    said torsion lock spring means for gripping said head rest stay to prevent vertical movement thereof, and when a sudden increased force is applied to a head rest body to thereby impart a corresponding increased downward sliding force to said head rest stay, said torsion lock spring means moves downwardly together with said head rest stay and is deformed along said inclined surface of said cavity thereby producing a stronger gripping force in said torsional lock spring means against said head rest stay, thus providing rigid gripping of said head rest stay by said spring means relative to said normal state to a degree that further downward sliding of said head rest stay through said spring means is substantially completely prevented.

2. The head rest device as in claim 1 wherein said head rest holder includes a thickened portion in said upper mouth portion and wherein said cap includes an engagement click adapted to being stopped by said thickened portion.

3. A head rest device for a vehicle seat comprising:
    an elongate head rest stay;
    a head rest holder adapted to be mounted to said vehicle seat and including a through bore extending axially between upper and lower ends of said head rest holder for accepting said head rest stay to thereby permit said head rest stay to be adjustable along an adjustment axis between raised and lowered height positions, said head rest holder also defining a cavity in communication with said through bore at said upper end, said cavity being defined by a side wall thereof which establishes an annular space with a circumferential portion of said head rest stay and a bottom wall establishing a downwardly inclined surface having upper and lower portions thereof relative to said adjustment axis; and
    lock means for releasably retaining said head rest stay in said raised and lowered height positions, said lock means including (a) a cap mounted to said upper end of said head rest holder for rotational movements relative thereto between locked and unlocked positions, (b) torsion spring means housed within said annular space and having one end connected to said head rest holder and another end connected to said cap such that said torsion spring means exhibits a lesser diameter when said cap is in said locked position to thereby exert of torsional force which grips and retains said head rest stay in said raised and lowered positions, and exhibits a greater diameter when said cap is rotated to said unlocked position to thereby release said torsional force which permits said head rest stay to be adjustable along said adjustment axis between said raised and lowered positions, wherein during a noraml state, one side of a lower end of said torsion spring means bears against said upper portion of said inclined surface while another side of said lower end of said torsion spring means is separated above said lower portion of said inclined surface to thereby permit said head rest stay to be adjustable along said adjustment axis between said raised and lowered positions when said cap is rotated to said unlocked position, and wherein,
    during an abnormal state experienced by an abnormal force being applied to said head rest stay when said cap is in said locked position tending to move said head rest stay in a direction towards said lowered position thereof, said torsion spring means and said inclined surface together cooperate to provide means for substantially preventing said head rest stay from moving in said direction by virtue of said another side of said torsion spring means being displaced towards said lower portion of said inclined surface responsive to said abnormal force while said one side of side torsion spring means continues to bear against upper said portion of said inclined surface such that the torsional force exerted by said torsion spring means is increased whereby movement of said head rest stay in said direction is substantially prevented.

4. A head rest device as in claim 3 further comprising movement-limiting means for limiting rotational movement of said cap and for establishing said locked and unlocked positions.

5. A head rest device as in claim 3 further comprising a recess formed at a lower portion of said head rest stay and a projection formed at said lower end of said head rest holder and projecting into said through bore, said projection engaging said recess when said head rest stay is moved beyond said raised position.

* * * * *